US009975631B1

(12) United States Patent
McLaren et al.

(10) Patent No.: US 9,975,631 B1
(45) Date of Patent: May 22, 2018

(54) TILTWING MULTICOPTER WITH FOLDABLE AND NON-FOLDABLE PROPELLERS

(71) Applicant: Kitty Hawk Corporation, Mountain View, CA (US)

(72) Inventors: Campbell McLaren, Alameda, CA (US); Damon Vander Lind, East Palo Alto, CA (US); Pranay Sinha, Sunnyvale, CA (US); Thomas Van Alsenoy, San Francisco, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 0 days. days.

(21) Appl. No.: 15/801,052

(22) Filed: Nov. 1, 2017

(51) Int. Cl.
*B64C 29/00* (2006.01)
*B64C 11/28* (2006.01)
*B64C 11/46* (2006.01)
*B64D 27/24* (2006.01)

(52) U.S. Cl.
CPC .......... *B64C 29/0033* (2013.01); *B64C 11/28* (2013.01); *B64C 11/46* (2013.01); *B64D 27/24* (2013.01)

(58) Field of Classification Search
CPC . B64C 29/0033; B64C 29/0075; B64C 11/46; B64C 11/28
See application file for complete search history.

(56) References Cited

U.S. PATENT DOCUMENTS

| 2,478,847 A | 8/1949 | Stuart | |
| 2,936,968 A * | 5/1960 | Mazzitelli | B64C 29/0033 244/7 |
| 3,035,789 A | 5/1962 | Young | |
| 8,800,912 B2 * | 8/2014 | Oliver | B64C 29/0033 244/12.4 |
| 9,475,579 B2 * | 10/2016 | Fredericks | B64C 25/52 |
| 9,694,911 B2 * | 7/2017 | Bevirt | B64D 27/24 |
| 2015/0360775 A1 * | 12/2015 | Arai | B60F 5/02 244/12.1 |
| 2016/0031555 A1 * | 2/2016 | Bevirt | B64C 11/28 244/7 C |
| 2017/0197702 A1 | 7/2017 | Alley | |

OTHER PUBLICATIONS

Author Unknown, Canadair CL-84, Wikipedia, Jul. 19, 2017, https://en.wikipedia.org/w/index.php?title=Canadair_CL-84 &oldid=789493109.
Author Unknown, NASA GL-10 Greased Lightning, Wikipedia, Jul. 19, 2017, https://en.wikipedia.org/w/index.php?title=NASA_GL-10_Greased_Lightning&oldid=733394169.
U.S. Appl. No. 15/447,028 entitled Bimodal Propeller Aircraft filed Mar. 1, 2017.

* cited by examiner

*Primary Examiner* — Brian M O'Hara
(74) *Attorney, Agent, or Firm* — Van Pelt, Yi & James LLP (57) ABSTRACT

An aircraft includes a front tiltwing which in turn includes two non-foldable outer propellers and four foldable inner propellers. The four foldable inner propellers are rotating at least some of the time while the front tiltwing is held in a vertical takeoff and landing position. The four foldable inner propellers are stowed at least some of the time while the front tiltwing is held in a forward flight position. The aircraft also includes a back tiltwing which includes two non-foldable back propellers.

19 Claims, 13 Drawing Sheets

Wings and Propellers in Vertical Takeoff and Landing Position

FIG. 1

Wings and Propellers in Vertical Takeoff and Landing Position

FIG. 2

Wings and Propellers in Vertical Takeoff and Landing Position

FIG. 3

Wings and Propellers in Vertical Takeoff and Landing Position

FIG. 4

Wings and Propellers in Forward Flight Position

FIG. 5

Wings and Propellers in Forward Flight Position

FIG. 6

Wings and Propellers in Forward Flight Position

FIG. 7

Wings and Propellers in Forward Flight Position

Vertical Takeoff and Landing Position

FIG. 12A

Forward Flight Position

Figure 1:
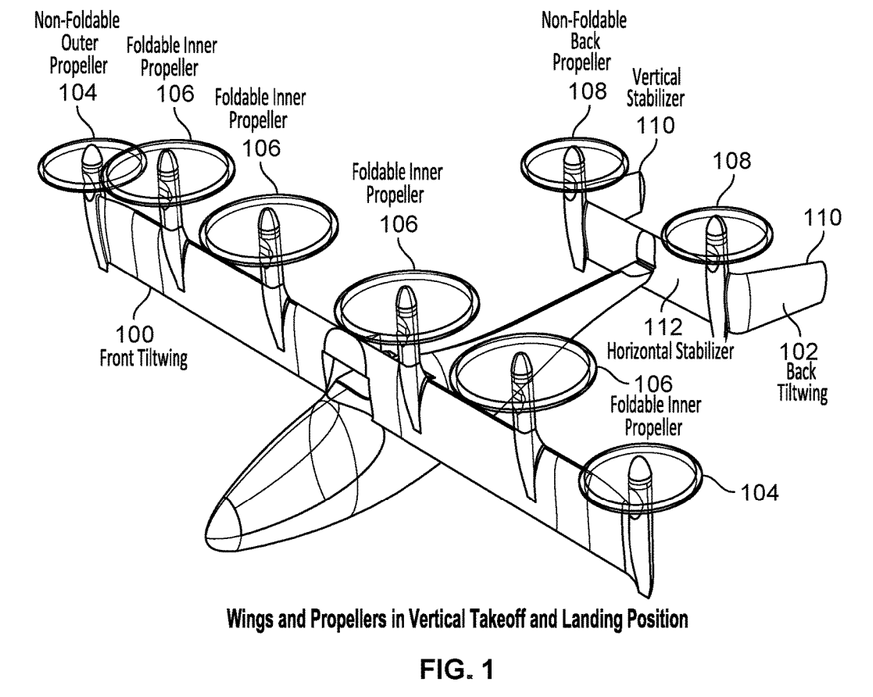

TILTWING MULTICOPTER WITH FOLDABLE AND NON-FOLDABLE PROPELLERS

BACKGROUND OF THE INVENTION

Although new types of aircraft are being developed which are all-electric, further improvements are always desirable. For example, new types of aircraft which improve upon the aircraft's responsiveness, stability, and/or range performance would be desirable.

BRIEF DESCRIPTION OF THE DRAWINGS

Various embodiments of the invention are disclosed in the following detailed description and the accompanying drawings.

FIG. 1 is a diagram showing an elevated view of an embodiment of a multicopter with its tiltwings in a position for vertical takeoff and landing.

FIG. 2 is a diagram showing a side view of an embodiment of a multicopter with its tiltwings in a position for vertical takeoff and landing.

FIG. 3 is a diagram illustrating a front view of an embodiment of a multicopter with its tiltwings in a position for vertical takeoff and landing.

FIG. 4 is a diagram illustrating a top view of an embodiment of a multicopter with its tiltwings in a position for vertical takeoff and landing.

FIG. 5 is a diagram showing an elevated view of an embodiment of a multicopter with its tiltwings in a position for forward flight.

FIG. 6 is a diagram showing a side view of an embodiment of a multicopter with its tiltwings in a position for forward flight.

FIG. 7 is a diagram illustrating a front view of an embodiment of a multicopter with its tiltwings in a position for forward flight.

FIG. 8 is a diagram illustrating a top view of an embodiment of a multicopter with its tiltwings in a position for forward flight.

FIG. 9 is a diagram illustrating an embodiment of a transition from vertical takeoff to forward flight.

FIG. 10 is a flowchart of a transitional process from a vertical takeoff and landing position to a forward flight position.

FIG. 11 is a flowchart of a transitional process from a forward flight position to a vertical takeoff and landing position.

FIG. 12A is a diagram illustrating an embodiment of actuation cylinders which are used to rotate the front tiltwing and back tiltwing where the tiltwings are in a vertical takeoff and landing position.

FIG. 12B is a diagram illustrating an embodiment of actuation cylinders which are used to rotate the front tiltwing and back tiltwing where the tiltwings are in a forward flight position.

FIG. 13A is a front-view diagram illustrating an embodiment of a foldable propeller with extended blades.

FIG. 13B is a front-view diagram illustrating an embodiment of a foldable propeller with folded blades.

FIG. 14A is a side-view diagram illustrating an embodiment of a foldable propeller with extended blades.

FIG. 14B is a side-view diagram illustrating an embodiment of a foldable propeller with folded blades.

FIG. 15A is a top-view diagram illustrating an embodiment of a foldable propeller with extended blades.

FIG. 15B is a top-view diagram illustrating an embodiment of a foldable propeller with folded blades.

FIG. 16A is an angled-view diagram illustrating an embodiment of a foldable propeller with extended blades.

FIG. 16B is an angled-view diagram illustrating an embodiment of a foldable propeller with folded blades.

FIG. 17A is a diagram illustrating an embodiment of foldable propeller with open blades and a pylon shaped to fit the stowed blades.

FIG. 17B is a diagram illustrating an embodiment of foldable propeller with folded blades and a pylon shaped to fit the stowed blades.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a tiltwing multicopter are described herein. In some embodiments, the aircraft includes a front tiltwing (where the front tiltwing includes two non-foldable outer propellers and four foldable inner propellers, the four foldable inner propellers are rotating at least some of the time while the front tiltwing is held in a vertical takeoff and landing position, and the four foldable inner propellers are stowed at least some of the time while the front tiltwing is held in a forward flight position) and a back tiltwing which includes two non-foldable back propellers. First, various views of an exemplary multicopter in a vertical takeoff and landing position are described. Then, various views of the multicopter in a forward flight position are described.

FIG. 1 is a diagram showing an elevated view of an embodiment of a multicopter with its tiltwings in a position for vertical takeoff and landing. In the example shown, the multicopter is capable of taking off and landing in a vertical manner. This may be desirable, for example, when there is a limited amount of space to take off or land.

The aircraft has two tiltwings: a front tiltwing (100) with six propellers (sometimes referred to as rotors) and a back tiltwing (102) with two propellers. In this example, the outer propellers (104) which are attached to the front tiltwing (100) are not foldable whereas the inner propellers (106) on that tiltwing are foldable. Vertical takeoff and landing requires greater thrust than that for forward flight, and so all of the propellers are shown in their open position and are in use here. As will be described in more detail below, the foldable inner propellers (106) are put into a closed or folded position during forward flight since the additional thrust from those propellers is not needed during forward flight. Turning off those propellers conserves battery life and increases range (the exemplary aircraft is an all-electric aircraft) and closing those propellers reduces drag.

The example multicopter shown here has the following overall dimensions:

TABLE 1

Overall Dimensions

| | |
|---|---|
| Span of Front Tiltwing | ~7 meters (~23 feet) |
| Span of Back Tiltwing | 2 meters (~6.6 feet) |
| Nose-to-Tail Length | 5 meters (~16.4 feet) |

In this example, the dimensions of the multicopter are selected so that the multicopter can fit into a trailer and be towed. For example, many states permit trailers with maximum widths of 8 feet and 6 inches. The dimensions of the multicopter permit the multicopter to fit (e.g., sideways) into a trailer and be towed.

In some embodiments, the exemplary multicopter is an ultralight aircraft, for example, as specified and/or regulated by the Federal Aviation Administration in the United States, the Civil Aviation Authority in New Zealand, etc. Such ultralight aircraft often weighs on the order of hundreds of kilograms. In this example, the multicopter shown has a gross weight of ~330 kg.

The front tiltwing (100) in this example is a straight, prismatic wing. A straight, prismatic wing is lighter and easier to manufacture than some other types of wings, such as a swept back wing. A straight, prismatic wing also has lower drag than a swept back wing. For these reasons, a straight, prismatic wing was selected for this design.

The back tiltwing (102) in this example includes two vertical stabilizers (110) connected to a horizontal stabilizer (112); this configuration is sometimes referred to as an H tail or a twin tail. The vertical tail area associated with the vertical stabilizers gives the multicopter good yaw stability. This tail arrangement with two vertical stabilizers is also more attractive than a tail with a single, taller vertical stabilizer since the same surface area (and correspondingly, degree of yaw stability) can be achieved while achieving a lower multicopter height (e.g., which makes it easier to put the multicopter into a trailer).

Compared to a previous prototype, the version shown here has a longer fuselage, for example approximately 5 meters from nose to tail compared to the previous length of approximately 3.5 meters from nose to tail. The previous prototype also did not include a twin tail. Rather, the previous prototype had a single canard (i.e., a single vertical stabilizer). Both of these things enable the current version shown here to have more yaw stability over the previous prototype.

The back tiltwing (102) includes two non-foldable propellers (108); sometimes these propellers are called the non-foldable back propellers in order to differentiate them from the non-foldable outer propellers (104) on the front tiltwing (100). By including propellers on the back tiltwing, the multicopter has additional lift, which is especially desirable during vertical takeoff and landing.

All of the propellers are connected to their respective tiltwing on the leading edge of the blade via a pylon. In the case of the foldable inner propellers (106) attached to the front tiltwing, the pylons provide sufficient clearance so that the blades of the propellers can be folded and/or stowed away without the tips of the blades coming into contact with the leading edge of the front tiltwing. For the non-foldable outer propellers (104), the pylons are slightly lower than the pylons for the foldable inner propellers, but some clearance between the leading edge of the front tiltwing and those propellers is desirable so that the tip of the blade does not hit the tiltwing. In this example, the propellers have dimensions in the following ranges. In the below table, the pylon clearance dimension refers to the distance between the plane of rotation associated with a particular group of propellers and the (e.g., leading edge of the) tiltwing to which that group of propellers is attached. The pylon clearance dimension does not, for example, include the height of any cap on the propeller.

TABLE 2

Propeller Dimensions

| Group of Propellers | Diameter Range | Pylon Clearance Range |
|---|---|---|
| Non-Foldable Propellers | 0.5-1 meters | Not Applicable |
| Foldable Propellers | 1-1.5 meters | 1-10 cm |

Since the foldable inner propellers (106) are primarily used for vertical takeoff and landing, those propellers may be optimized for that type of use. For example, the blade characteristics (e.g., twist angle, pitch angle, etc.) may be optimized for vertical thrust and/or vertical lift. With respect to pitch angle, presenting a flatter blade to the relative wind is better for this type of flight. A flatter pitch angle provides more upward thrust and therefore is good for vertical takeoff and landing where a lot of upward thrust is desired. Also, the twist angle may be selected and/or optimized for vertical takeoff and landing (e.g., the blade tip has a twist angle of 10-20 degrees, which is good for vertical takeoff and landing).

Figure 2:
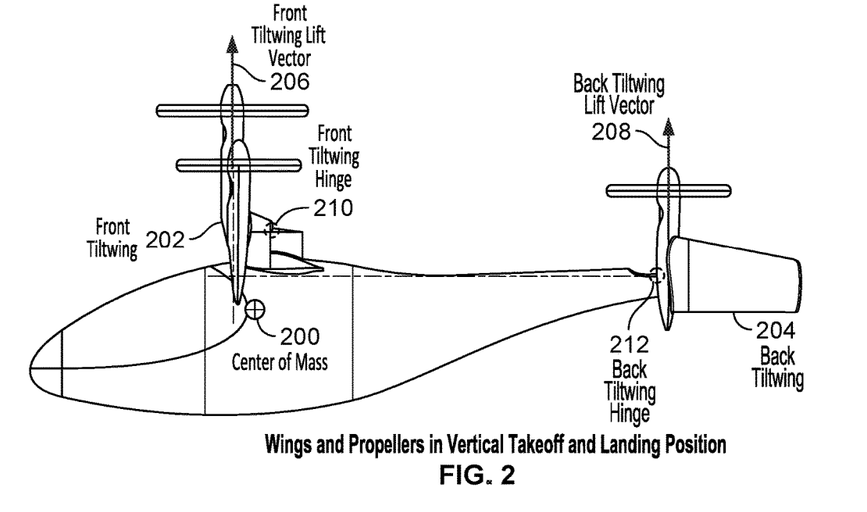

The following figure shows a corresponding side view.

FIG. 2 is a diagram showing a side view of an embodiment of a multicopter with its tiltwings in a position for vertical takeoff and landing. In the example shown, the multicopter's center of mass (200) is shown. It is noted that the center of mass is dependent upon the position of the tiltwings and the center of mass may change when the front tiltwing (202) and back tiltwing (204) change positions (e.g., the tiltwings rotate to be in a forward flight position). The front tiltwing lift vector (206) and the back tiltwing lift vector (208) are also shown and as this side view shows, the center of mass (200) is located between the two lift vectors (206 and 208). This relative positioning (i.e., with the center of mass between the two lift vectors) makes the multicopter easier to maneuver and/or more stable in this position.

This view also shows the two hinges about which the tiltwings rotate when switching between the vertical takeoff and landing position (shown) and the forward flight position (not shown). Hinge 210 shows the hinge about which the front tiltwing (202) rotates and hinge 212 shows the hinge about which the back tiltwing (204) rotates. It is noted that the center of mass (200) is lower than both the front tiltwing hinge (210) and the back tiltwing hinge (212). This arrangement is desirable with respect to layout and parts placement. In some embodiments, the hinges are corner hinges (e.g., door hinges) where a first plate or surface is connected to the fuselage and a second plate or surface is connected to the appropriate tiltwing.

Figure 3:
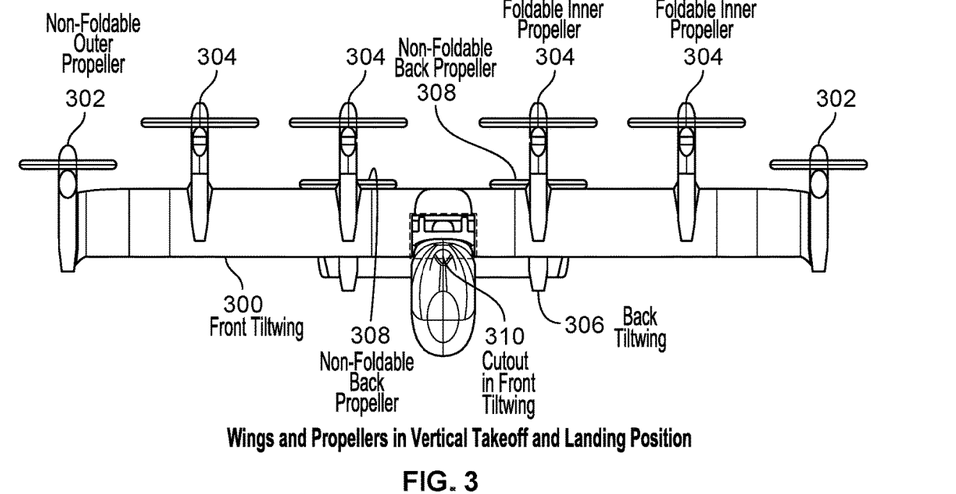

The following figure shows a corresponding front view.

FIG. 3 is a diagram illustrating a front view of an embodiment of a multicopter with its tiltwings in a position for vertical takeoff and landing. From the view shown, different pylon heights associated with the front tiltwing (300) are more apparent. The two non-foldable outer propellers (302) have a shorter pylon whereas the four foldable inner propellers (304) are attached to the front tiltwing (300) using taller pylons. Although partially obscured, the back tiltwing (306) and back tiltwing propellers (308) are identified for context.

This view of the multicopter also shows that the front tiltwing (300) includes a cutout (310). As will be described in more detail below, when the front tiltwing rotates down and/or forward into the forward flight position, the cutout will fit neatly with the top of the fuselage.

Figure 4:
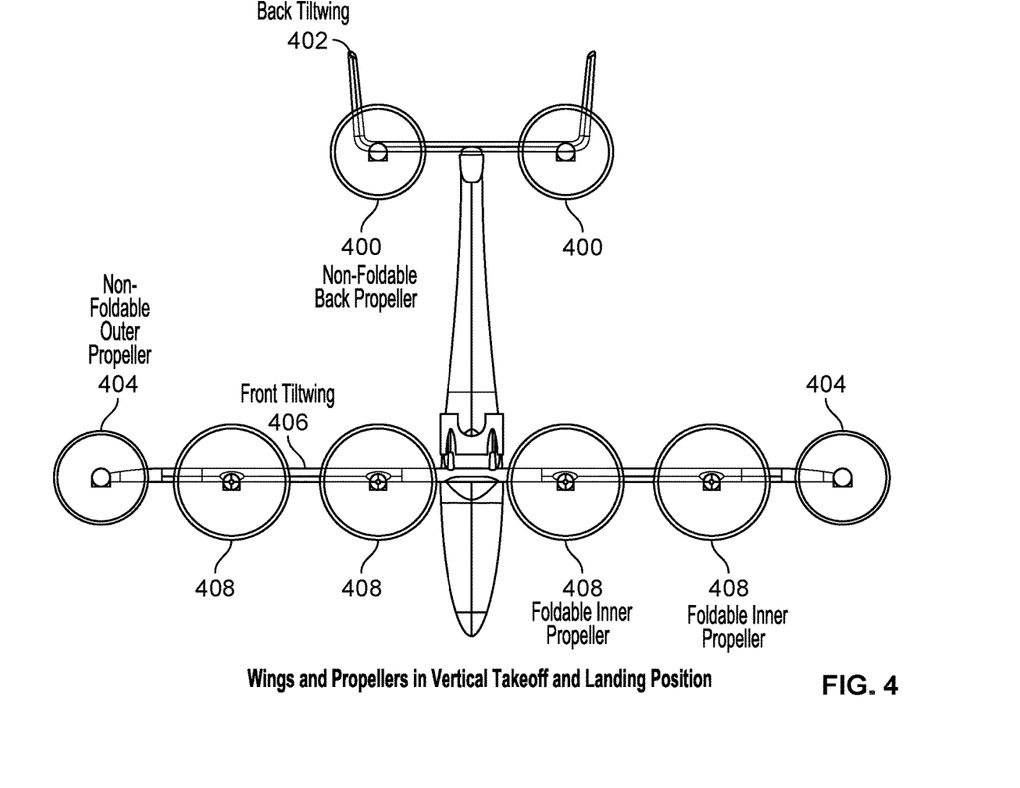

The following figure shows a corresponding top view.

FIG. 4 is a diagram illustrating a top view of an embodiment of a multicopter with its tiltwings in a position for vertical takeoff and landing. From this top view, the relative diameters of the various propellers are more apparent. As described above in Table 2, the diameter of the non-foldable back propellers (400), which are attached to the back tiltwing (402), and the non-foldable outer propellers (404), which are attached to the front tiltwing (406), are smaller in diameter compared to the foldable inner propellers (408). The cruise propellers must have steeper pitches such that they are able to provide thrust in cruise, while the folding propellers are shallow pitch and able to generate thrust more capably in hover. A shallower pitch blade at large diameters is more efficient and uses less torque per thrust, hence the different diameters.

After performing a vertical takeoff, the multicopter rotates the front tiltwing (406) and back tiltwing (402) forward (not shown here) so that all of the propellers are rotating about a longitudinal axis of rotation instead of a vertical axis of rotation. This position or configuration is sometimes referred to herein as a forward flight position or configuration. In addition to rotating the tiltwings down and/or forward, the foldable inner propellers (408) are folded up (e.g., when the aircraft is in a stable state and it is safe to stop and stow those propellers). The thrust from these propellers (408) is not needed in the forward flight position, and so those propellers are turned off to conserve power and/or increase range. To reduce drag, those propellers (408) are folded up so that the blades are tucked into and/or along the side of their respective pylons.

First, some figures showing the exemplary multicopter in the forward flight position are described below. Then, a sequence showing an example transition from vertical takeoff and landing to forward flight (including the rotation of the tiltwings and the stowing of the foldable propellers) is described.

Figure 5:
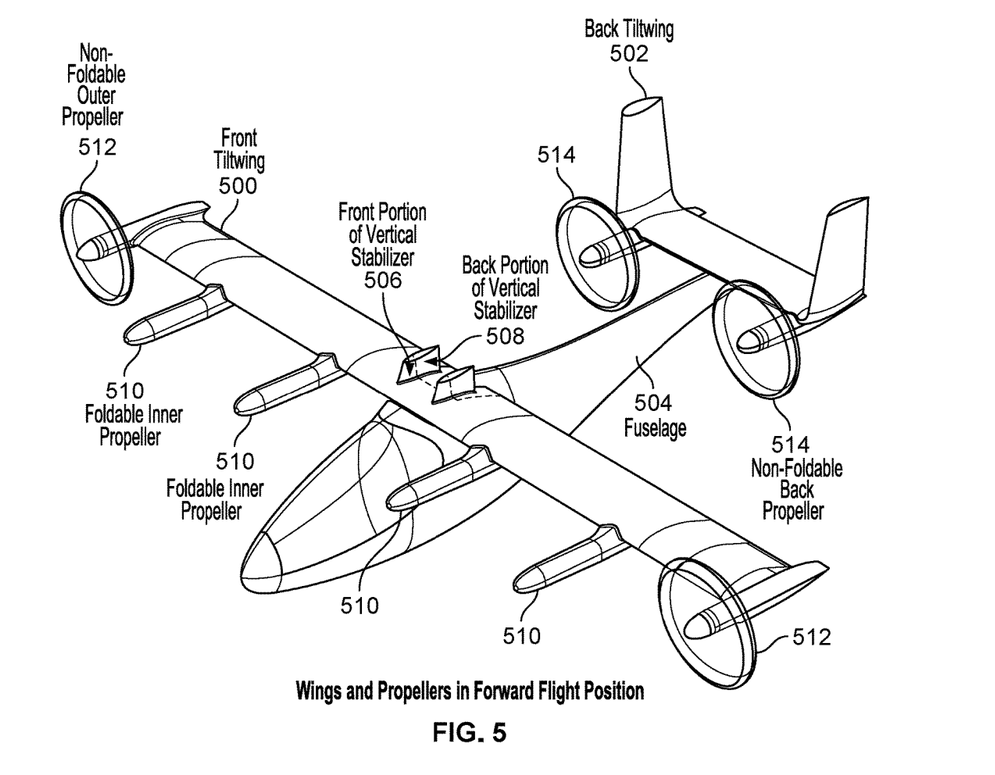

FIG. 5 is a diagram showing an elevated view of an embodiment of a multicopter with its tiltwings in a position for forward flight. In this example, the front tiltwing (500) and back tiltwing (502) have rotated downward and/or forward so that the propellers are rotating about a longitudinal axis of rotation instead of a vertical axis of rotation. Returning briefly to FIG. 3, it is shown there that the front tiltwing includes a cutout (310). In FIG. 5, that cutout permits the front tiltwing (500) and the top of the fuselage (504) to fit together when the front tiltwing is in the forward flight position as shown here. It is noted that the front part of the vertical stabilizers (506) is formed by or comes from the front tiltwing (500) and the back portion of the vertical stabilizers (508) is formed by or comes from the top of the fuselage (504). This design choice to split up the vertical stabilizers was made because allows an airfoil shape in cruise but with a sturdier structure than a single airfoil.

When flying in this forward flight position, it is not necessary for all of the propellers to be on. As such, the foldable inner propellers (510) are turned off at an appropriate time and/or when it is safe to do so. The non-foldable outer propellers (512) and the non-foldable back propellers (514). It is noted that the propellers which are kept on (i.e., propellers 512 and 514) are the outermost propellers (i.e., the ones at the corners) which give the multicopter the most maneuverability.

Figure 6:
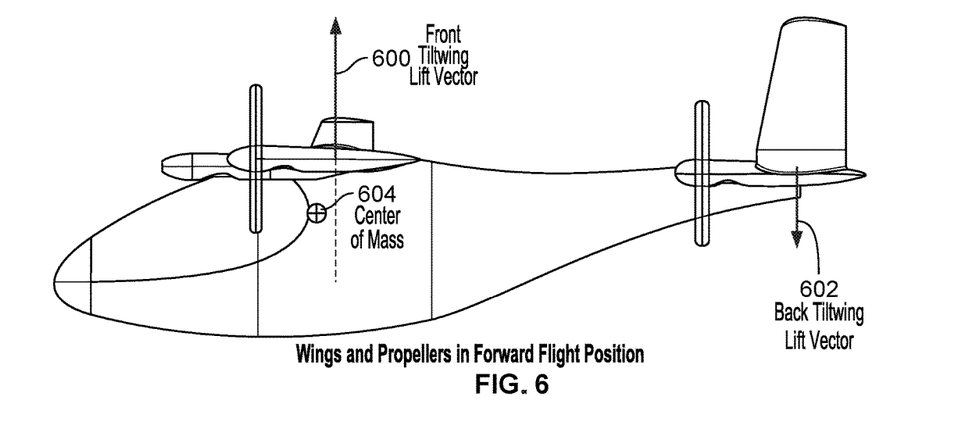

The following figure shows a corresponding side view.

FIG. 6 is a diagram showing a side view of an embodiment of a multicopter with its tiltwings in a position for forward flight. When flying in this mode, the position of the front tiltwing lift vector (600) and back tiltwing lift vector (602) depends upon where the aerodynamic lift forces act on the respective wings, which in turn is determined by the shape of the respective wing. In this position, the center of mass (604) is slightly forward relative to the front tiltwing lift vector (600).

Figure 7:
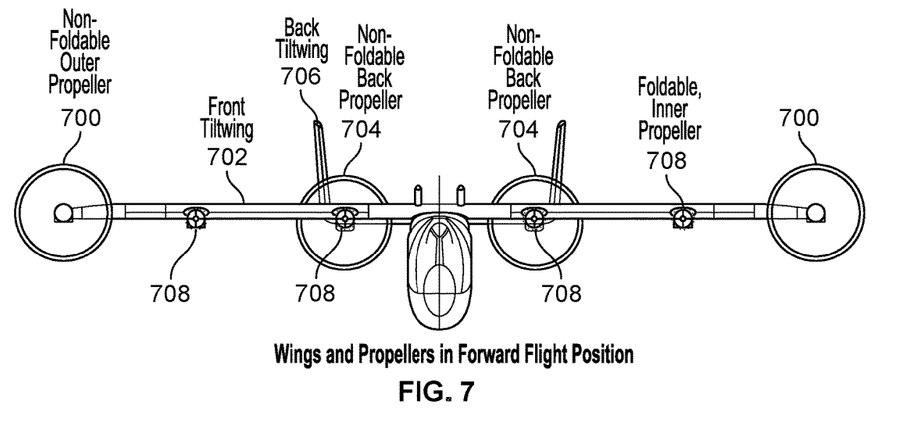

The following figure shows a corresponding front view.

FIG. 7 is a diagram illustrating a front view of an embodiment of a multicopter with its tiltwings in a position for forward flight. As this view shows, the non-foldable outer propellers (700), which are attached to the front tiltwing (702), are rotating, as are the non-foldable back propellers (704), which are attached to the back tiltwing (706). The foldable inner propellers (708) are stowed away and are shown with a dotted circle to make them more visible.

Figure 8:
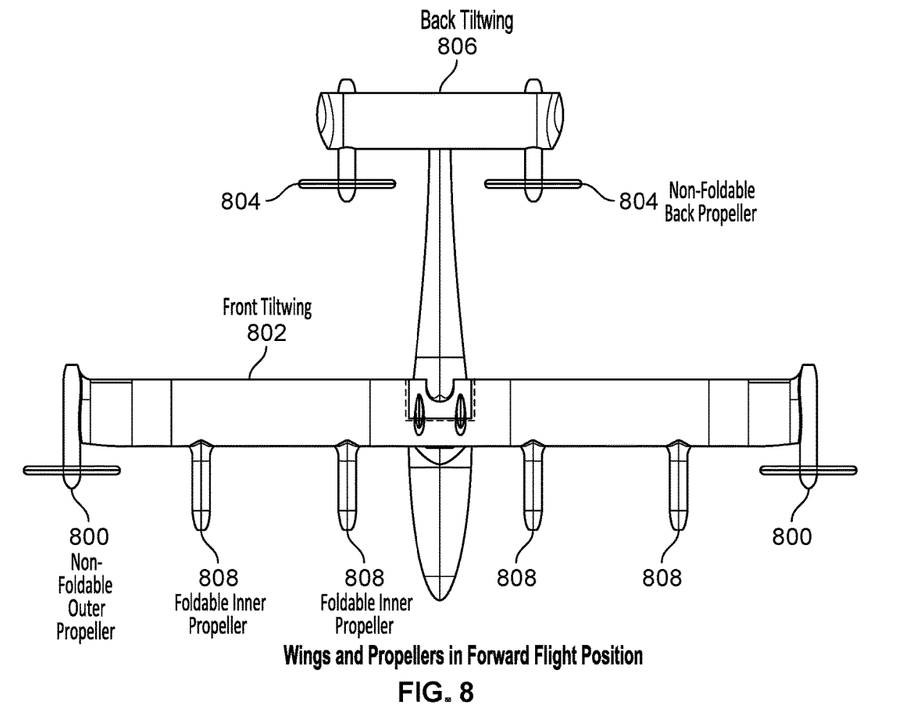

The following figure shows a corresponding top view.

FIG. 8 is a diagram illustrating a top view of an embodiment of a multicopter with its tiltwings in a position for forward flight. As before, the non-foldable outer propellers (800), which are attached to the front tiltwing (802), are open, as are the non-foldable back propellers (804), which are attached to the back tiltwing (806). The foldable inner propellers (808) are folded away.

The following figure shows an example of how the exemplary multicopter transitions from vertical takeoff (e.g., where the tiltwings and propellers are in the positions shown in FIGS. 1-4) to forward flight (e.g., where the tiltwings and propellers are in the position shown in FIGS. 5-8).

Figure 9:
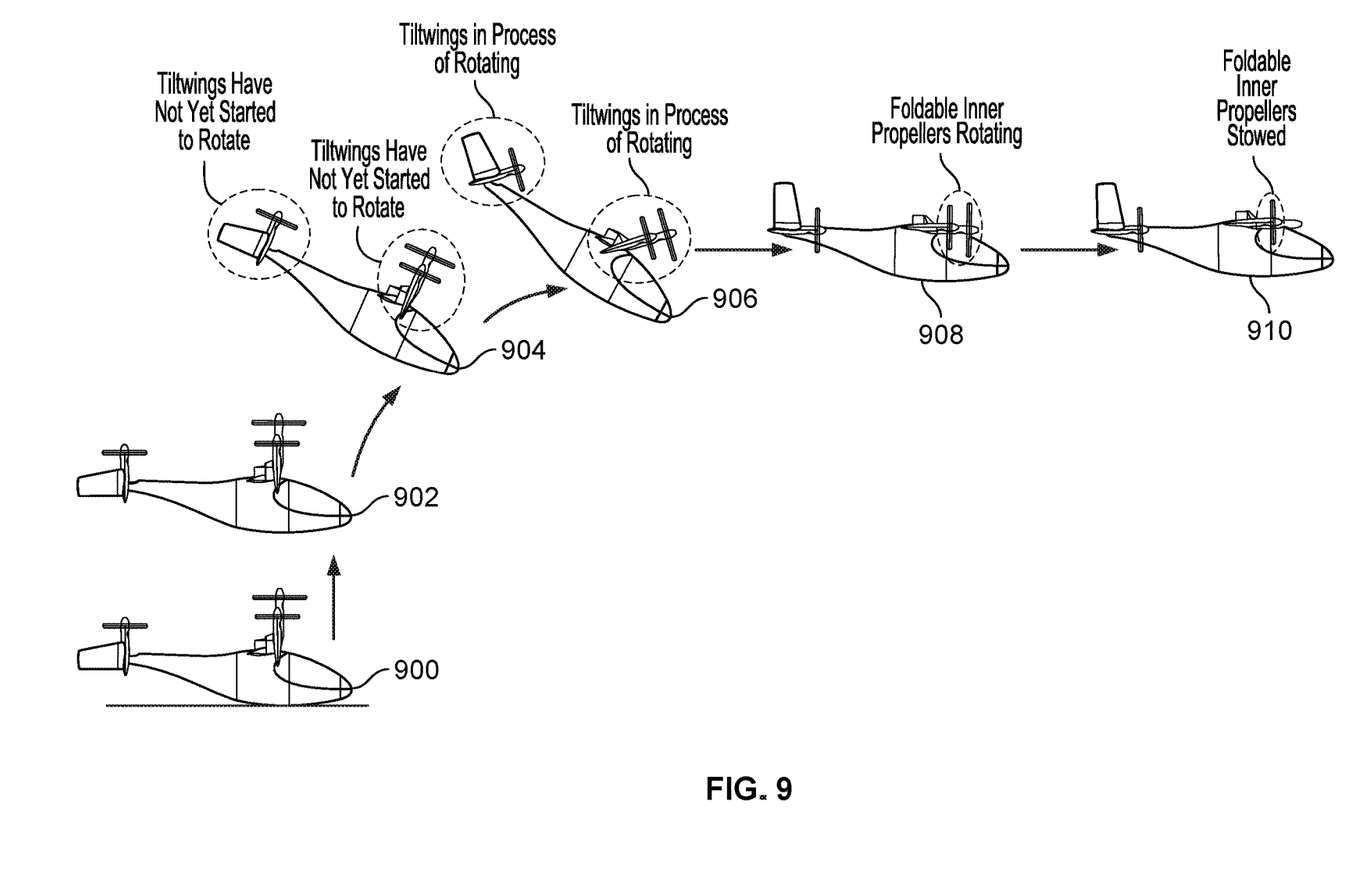

FIG. 9 is a diagram illustrating an embodiment of a transition from vertical takeoff to forward flight. In the example shown, the multicopter is on the ground in position 900. Although not shown in this figure, other multicopter embodiments may include any appropriate landing gear as desired (e.g., wheels, floats, skids, etc.). From the on-the-ground position (900), the multicopter ascends vertically as it performs a vertical takeoff and ascends vertically to position 902. For example, the pilot may wish to ascend to some desired and/or recommended altitude before attempting the transition to forward flight so that the multicopter is in no danger of colliding with objects at lower altitudes during the transition (e.g., power lines, buildings, trees, etc.).

From position 902, the multicopter pitches forward from a level position and gets into pitched position 904. It is noted that during the transition from level position 902 to pitched position 904, both the front tiltwing and the back tiltwing are still in the vertical takeoff and landing position. That is, they have not yet begun to rotate into the forward flight position at this time. In this example, the pitch angle of the multicopter at position 902 is approximately 20°. As shown here, the multicopter is also ascending (i.e., moving upward vertically) as well as moving forward as it begins to pitch forward from position 902 to position 904.

From pitched position 904, the front tiltwing and back tiltwing begin to rotate down and forward into the forward flight position. See, for example, position 906, where both the front tiltwing and back tiltwing have partially completed their rotation from the vertical takeoff and landing position (see, e.g., FIGS. 1-4) to the forward flight position (see, e.g., FIGS. 5-8) and are shown halfway between those two positions. The multicopter also continues to ascend and also continues to move forward during this transition from pitched position 904 to partially-rotated position 906.

The multicopter continues to rotate the front tiltwing and back tiltwing forward and downward until the tiltwings are completely in the forward flight position, while the multicopter is tilted forward. In general, all transitional positions have the wings orientated in a way such that they are at the climb or descent angle that is desired. The wings are roughly level to the flow while the fuselage may be level or tilted down (possibly substantially). Once the tiltwings have completed their rotation, the multicopter levels off. See, for example, position 908 where the front tiltwing and back tiltwing are in the forward flight position and the multicopter is level.

The multicopter then stops and stows the foldable inner propellers, as shown in 910. Note, for example, that the front tiltwing in position 908 has two sets of propellers visible, whereas the front tiltwing in position 910 only has a single set of propellers visible.

Figure 10:
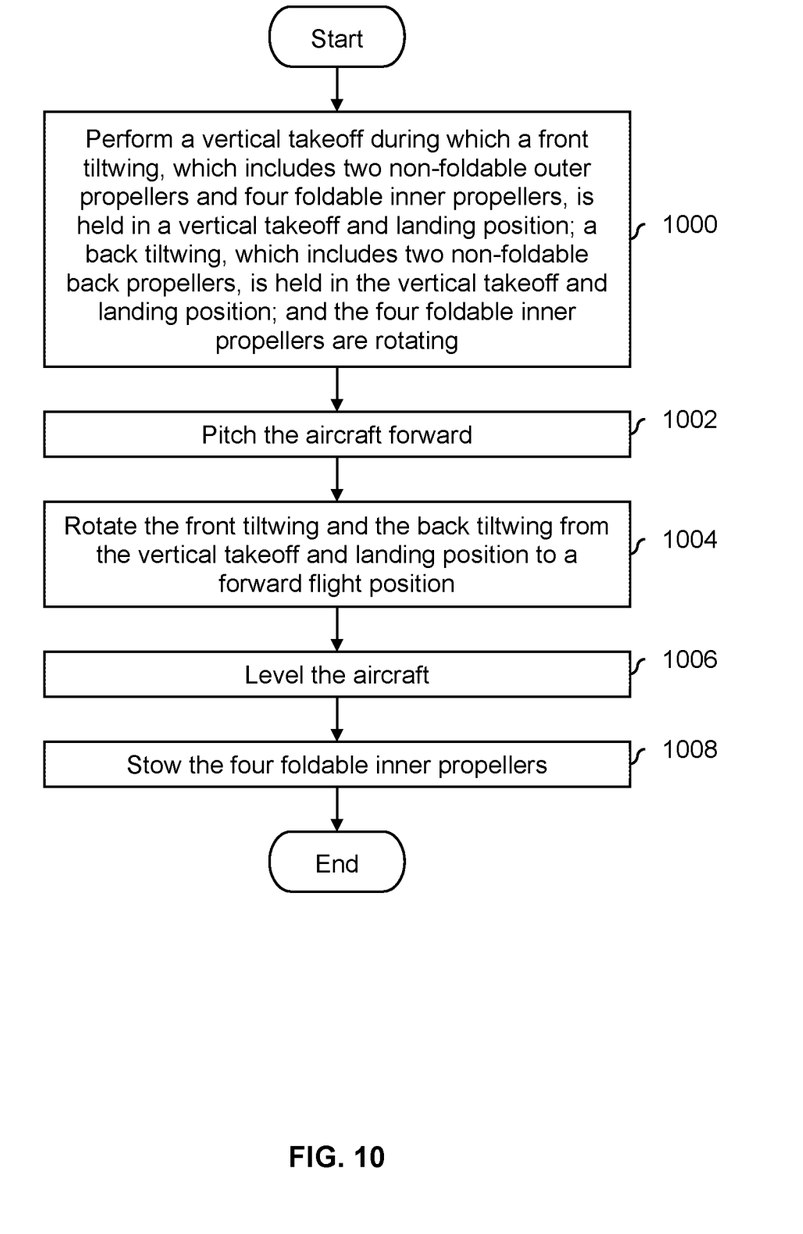

This transition is described more generally and/or formally in the flowchart below.

FIG. 10 is a flowchart of a transitional process from a vertical takeoff and landing position to a forward flight position. In some embodiments, the process is performed at least partially automatically by a flight controller. For example, making the transition from a vertical takeoff and landing position to a forward flight position may be difficult for an inexperienced pilot to do. For safety and ease of use, an aircraft may be able to perform the transition automatically once instructed to do so by the pilot and/or passenger.

At 1000, a vertical takeoff is performed during which a front tiltwing, which includes two non-foldable outer propellers and four foldable inner propellers, is held in a vertical takeoff and landing position; a back tiltwing, which includes two non-foldable back propellers, is held in the vertical takeoff and landing position; and the four foldable inner propellers are rotating. See, for example, positions 900 and 902 in FIG. 9.

At 1002, the aircraft is pitched forward. See, for example, position 904 in FIG. 9.

At 1004, the front tiltwing and the back tiltwing are rotated from the vertical takeoff and landing position to a forward flight position. See, for example, positions 906 and 908 in FIG. 9 and note how the tiltwings swing down and forward.

At 1006, the aircraft is leveled. See, for example, the transition from position 906 (where the aircraft is pitched forward) to position 908 (where the aircraft is level) in FIG. 9.

At 1008, the four foldable inner propellers are stowed. See, for example, the transition from position 908 (where the foldable inner propellers are rotating) to position 910 (where the foldable inner propellers are stowed) in FIG. 9.

Returning briefly to FIG. 9, a similar transition occurs when the aircraft lands and the transition from forward flight position to vertical takeoff and landing position is made. The aircraft would generally fly forward and descend and the sequence of positions would follow the reverse sequence: 910→ . . . →900. For brevity, that reverse sequence of positions is not shown and/or described in great detail here. The following flowchart does, however, describe such a process.

Figure 11:
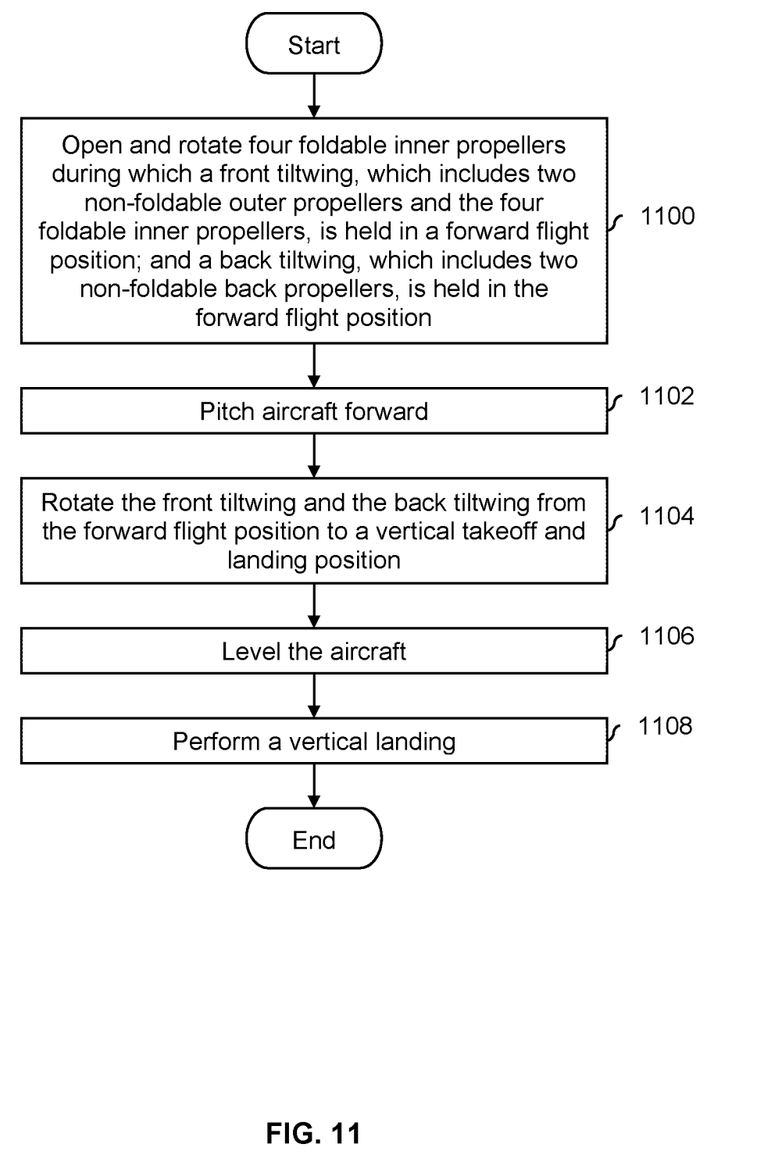

FIG. 11 is a flowchart of a transitional process from a forward flight position to a vertical takeoff and landing position. In some embodiments, the process is performed at least partially automatically by a flight controller.

At 1100, four foldable inner propellers are opened and rotated during which a front tiltwing, which includes two non-foldable outer propellers and the four foldable inner propellers, is held in a forward flight position; and a back tiltwing, which includes two non-foldable back propellers, is held in the forward flight position. For example, this would correspond to a transition from position 910 to 908 in FIG. 9. The aircraft would be flying forward at a relatively constant altitude (i.e., the aircraft has not yet started descending).

At 1102, the aircraft is pitched forward. For example, the aircraft would begin to descend and the aircraft would be pitched forward. The front tiltwings and the back tiltwings would still be held in the forward flight position and would have not yet started their rotation.

At 1104, the front tiltwing and the back tiltwing are rotated from the forward flight position to a vertical takeoff and landing position. See, for example, the transition from position 906 (where the tiltwings are caught mid-rotation) to position 904 (where the tiltwings have completed their rotation into the vertical takeoff and landing position) in FIG. 9. Generally speaking, the aircraft is flying forward and descending during this time.

At 1106, the aircraft is leveled. See, for example, position 902 where the aircraft is no longer tilted forward.

At 1108, a vertical landing is performed. See, for example, the transition from hovering position 902 to on-the-ground position 900.

Figure 12A:
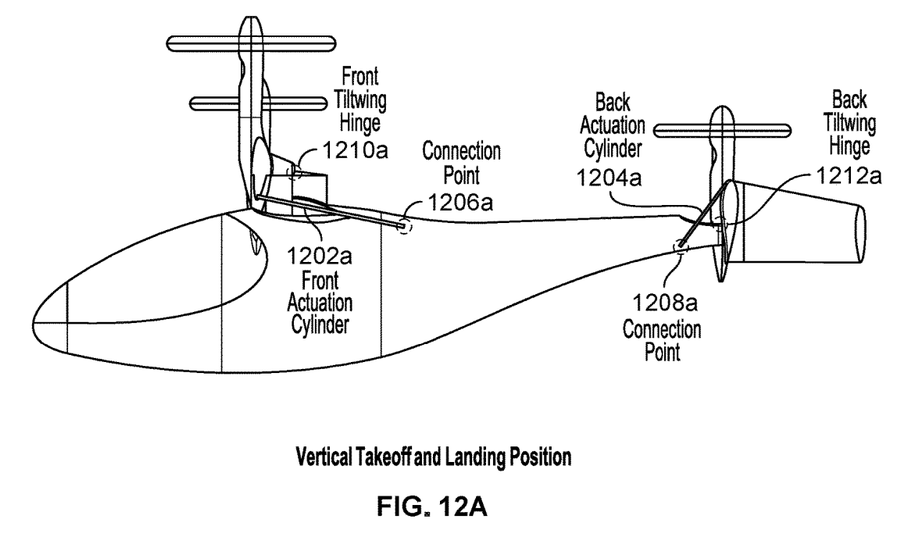

The following figure shows an example of a component to switch the tiltwings between the vertical takeoff and landing position and the forward flight position.

FIG. 12A is a diagram illustrating an embodiment of actuation cylinders which are used to rotate the front tiltwing and back tiltwing where the tiltwings are in a vertical takeoff and landing position. For clarity, some pylons and propellers are not shown because they would obstruct the objects of interest (e.g., actuation cylinders, their connection points, the hinges, etc.).

In this example, the front actuation cylinder (1202a/1202b) is used to rotate the front tiltwing and the back actuation cylinder (1204a/1204b) is used to rotate the back tiltwing. In various embodiments, these the actuation cylinders may be pneumatic, hydraulic, or electric actuators. Each actuation cylinder is connected to a fixed point on the aircraft. For example, the front actuation cylinder (1202a/1202b) is connected to a front fixed connection point (1206a/1206b) and the back actuation cylinder (1204a/1204b) is connected to back fixed connection point (1208a/1208b). The other end of a given actuation cylinder is attached to the respective tiltwing being moved.

Figure 12B:
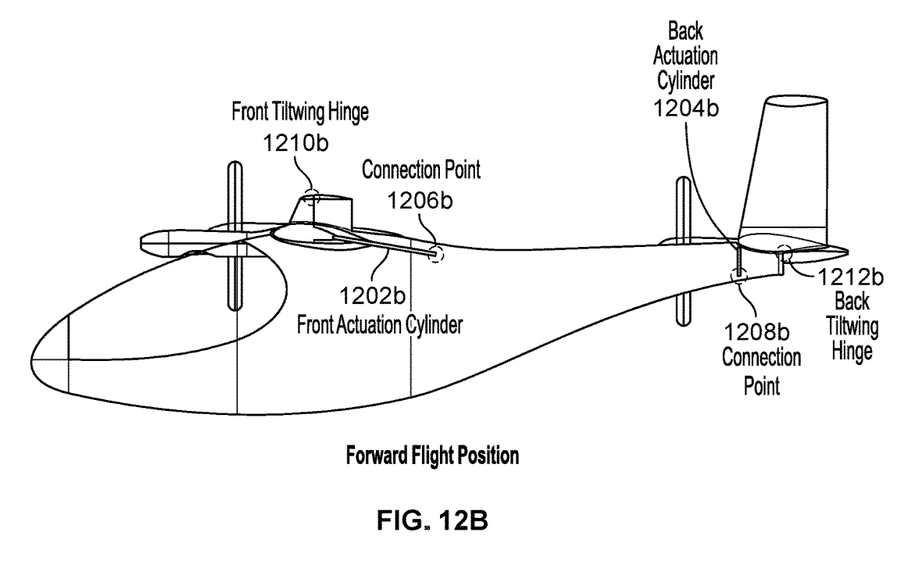

FIG. 12B is a diagram illustrating an embodiment of actuation cylinders which are used to rotate the front tiltwing and back tiltwing where the tiltwings are in a forward flight position. By extending or retracting a particular actuation cylinder (e.g., front actuation cylinder 1202a/1202b or back actuation cylinder 1204a/1204b), the corresponding tiltwing rotates about the corresponding hinge (e.g., front tiltwing hinge 1210a/1210b or back tiltwing hinge 1212a/1212b). For example, in FIG. 12A, the actuation cylinders are extended, which causes the tiltwings to point upwards so that the propellers rotate about a vertical axis of rotation (i.e., the tiltwings are in the vertical takeoff and landing position). In FIG. 12B, the actuation cylinders are retracted so that the tiltwings point forward so that the propellers rotate about a longitudinal axis of rotation (i.e., the tiltwings are in the forward flight position).

Although only one actuation cylinder is shown per tiltwing from this view, for redundancy (which is desirable in an aircraft), there may be two or more actuation cylinders per tiltwing. This would enable the tiltwings still to be moved even if one of the actuation cylinders became inoperable.

The following figures describe various embodiments of foldable propellers which may be used in the exemplary multicopter described above. In the first embodiment, the pylons are rectangular cuboids with rounded edges (e.g., with no cutouts for the blades of the propellers to fit into). In the second embodiment, the pylons have cutouts shaped to fit the blades so that when the blades are folded up and stowed away, the propeller is substantially cylindrical in shape which (further) reduces drag during forward flight.

Figure 13A:
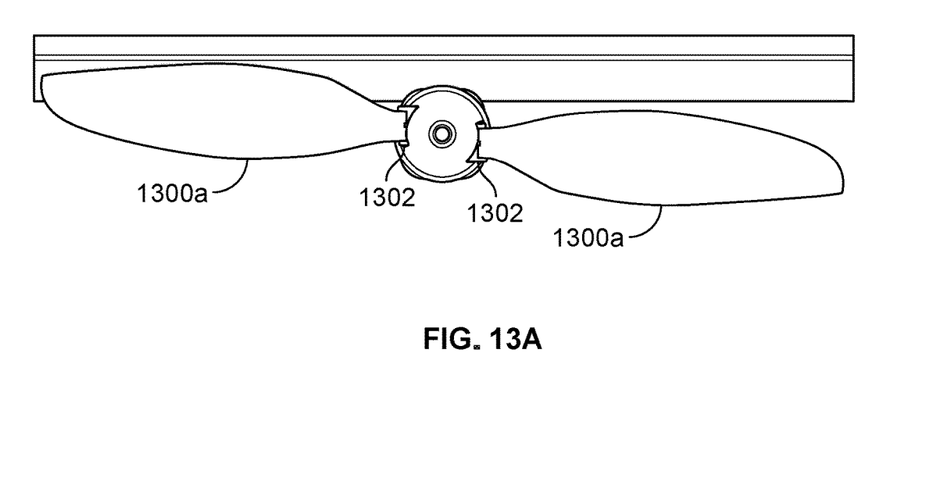

FIG. 13A is a front-view diagram illustrating an embodiment of a foldable propeller with extended blades. In the example shown, the blades (1300a) of the propeller are open and extended. The blades are connected to the rest of the propeller via hinges 1302. The blades open and close passively and rotate freely about the hinges. When the rotor is spun up, centrifugal force causes the blades to (e.g., passively) open and extend, as shown in this figure. When the rotor is stopped, the blades fold in.

As seen from this view, the hinges are have a vertical offset (e.g., they do not line up on the same horizontal line) which creates a corresponding vertical offset in the blades.

Figure 13B:
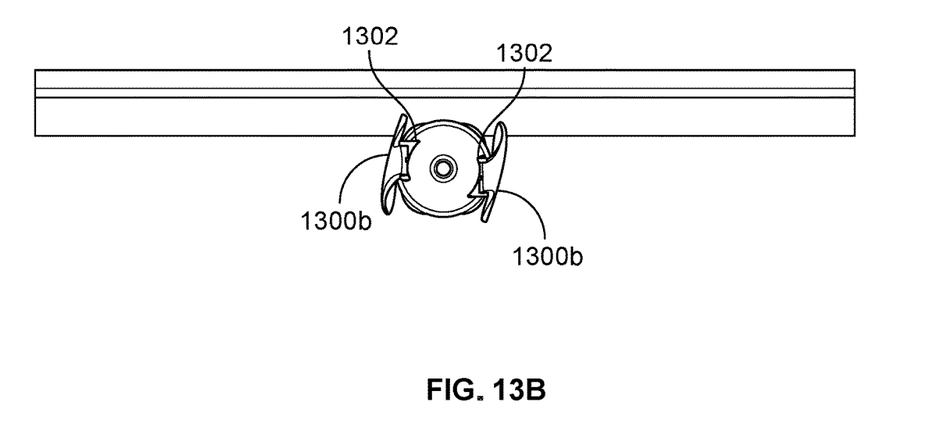

FIG. 13B is a front-view diagram illustrating an embodiment of a foldable propeller with folded blades. In this example, the blades (1300b) of the propeller are closed and folded. To put the blades into this position, the propeller is stopped. The multicopter is expected to be flying a forward flight mode during this time and the forward movement (e.g., and resulting wind resistance) will push the blades back (e.g., from the plane of rotation) into a closed position. This passive opening and closing of the blades helps to reduce potential points of failure and keeps weight and complexity down. To open the blades (e.g., putting the propeller back into the position shown in FIG. 13A), the propellers would be "spun up."

Figure 14A:
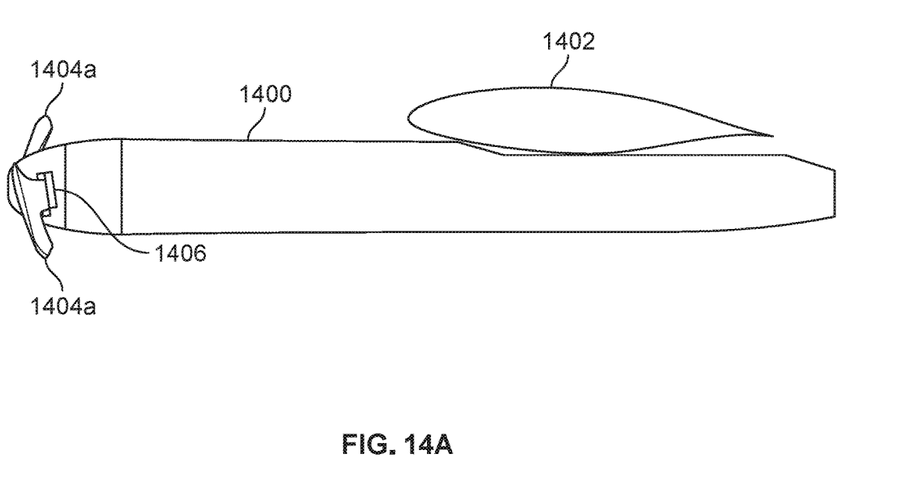

FIG. 14A is a side-view diagram illustrating an embodiment of a foldable propeller with extended blades. In this view, the pylon (1400) and front tiltwing (1402) are more visible. The open blades (1404a) are also shown, as is the hinge (1404).

Figure 14B:
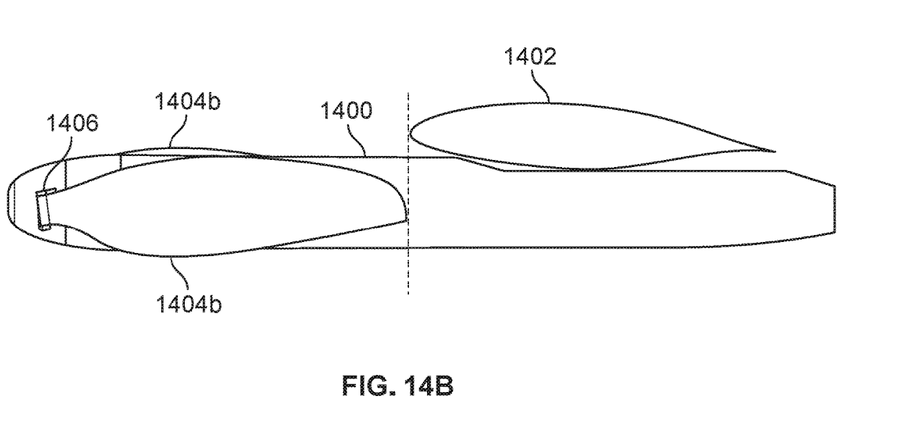

FIG. 14B is a side-view diagram illustrating an embodiment of a foldable propeller with folded blades. In this view, the blades (1404b) are folded. As shown here, the pylon (1400) is long enough so that the tips of the folded blades (1404b) do not come into contact with the leading edge of the front tiltwing (1402) when the blades are folded.

Figure 15A:
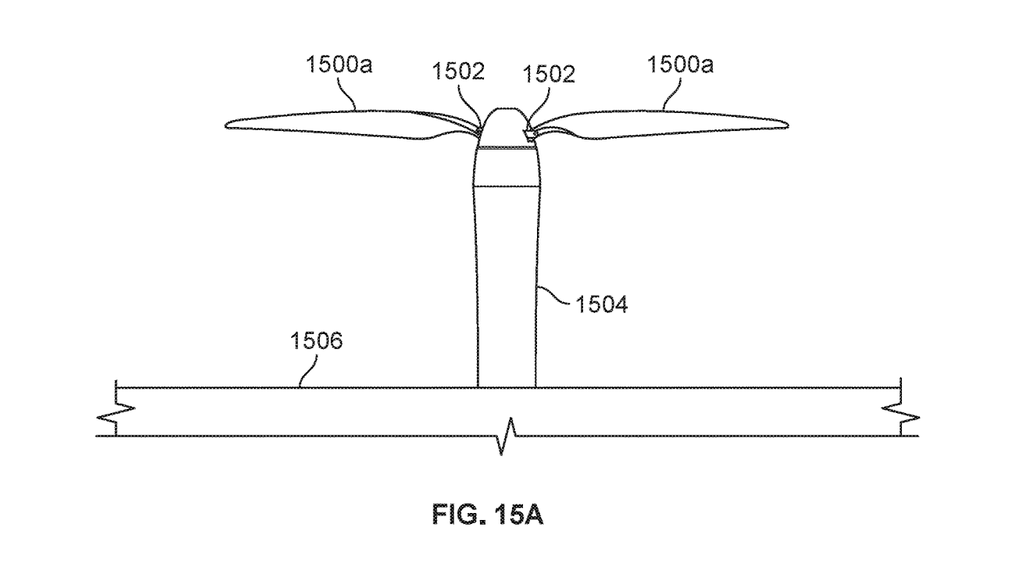

FIG. 15A is a top-view diagram illustrating an embodiment of a foldable propeller with extended blades. In this view, the blades (1500a) are open. The hinges (1502), pylon (1504), and front tiltwing (1506) are also visible.

Figure 15B:
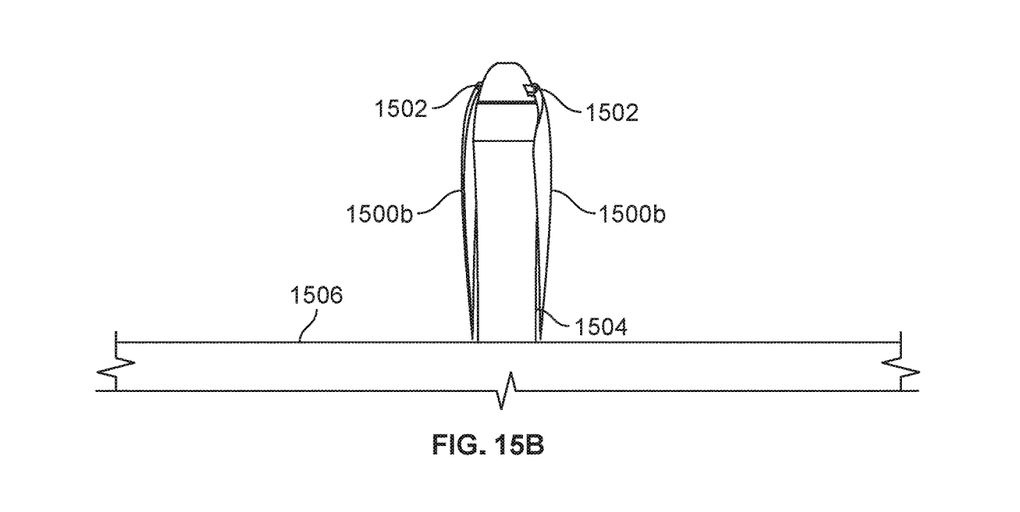

FIG. 15B is a top-view diagram illustrating an embodiment of a foldable propeller with folded blades. In this view, the blades (1500b) are closed.

Figure 16A:
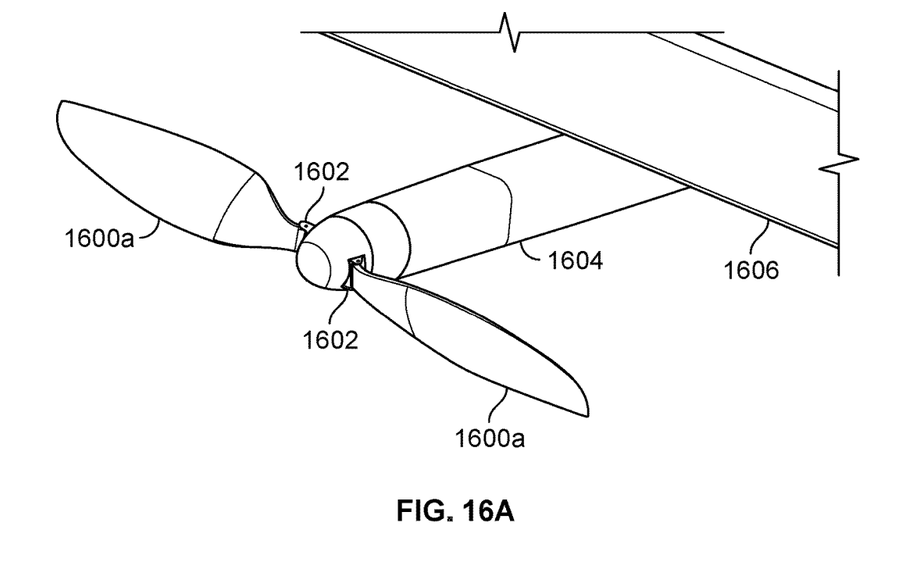

FIG. 16A is an angled-view diagram illustrating an embodiment of a foldable propeller with extended blades. In this view, the blades (1600a) are open. The hinges (1602), pylon (1604), and front tiltwing (1606) are also visible.

Figure 16B:
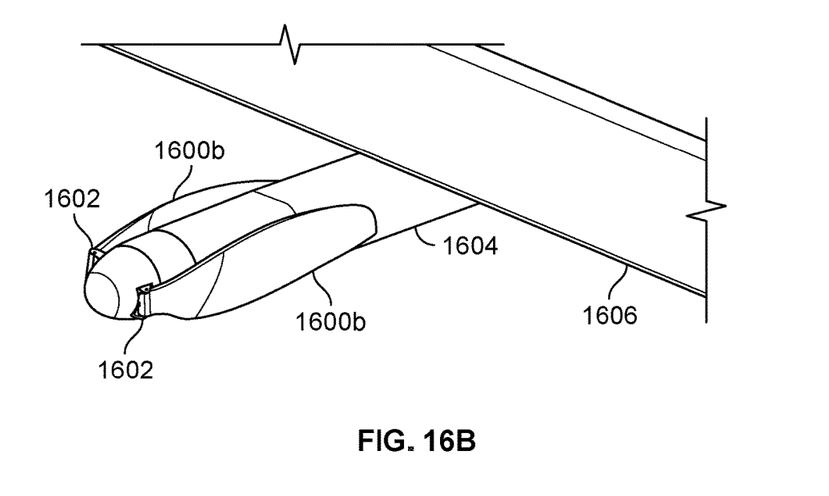

FIG. 16B is an angled-view diagram illustrating an embodiment of a foldable propeller with folded blades. In this view, the blades (1600b) are closed.

Figure 17A:
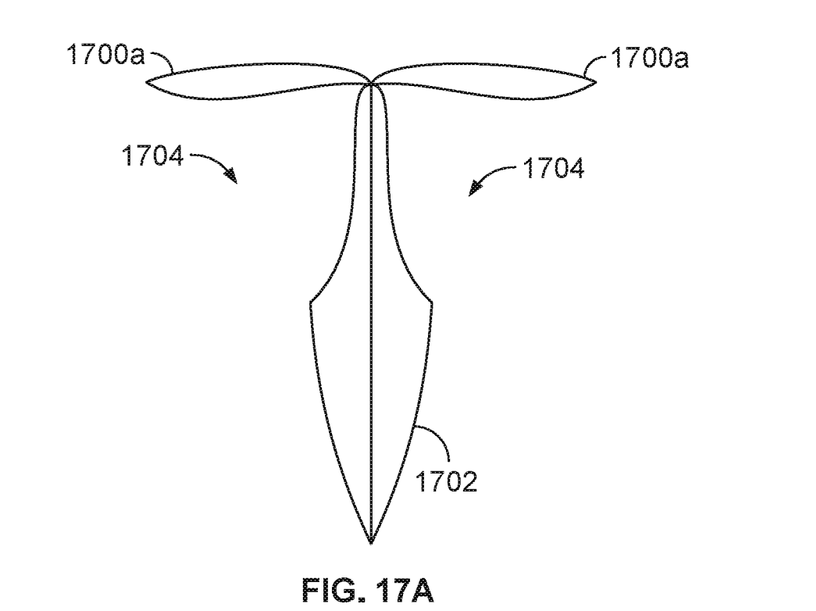

FIG. 17A is a diagram illustrating an embodiment of foldable propeller with open blades and a pylon shaped to fit the stowed blades. In this view, the blades (1700a) are open. The propeller also includes pylon 1702 which has a concave portions (1704) that the blades fit into when they are closed or stowed. This concave portion may also be referred to as a concave depression or a cutout. In some embodiments, concave depression (1704) may be shaped according to a corresponding blade's curvature.

Figure 17B:
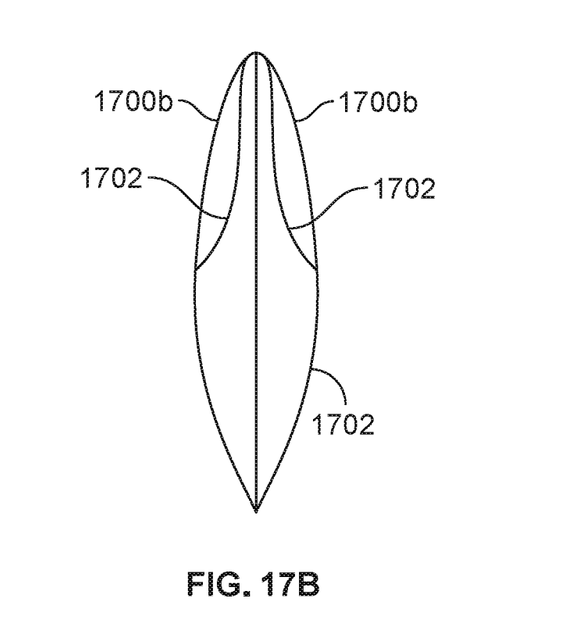

FIG. 17B is a diagram illustrating an embodiment of foldable propeller with folded blades and a pylon shaped to fit the stowed blades. In the example shown, blades 1700b are folded and tucked into pylon 1702, specifically, cutout 1702. As shown, when folded, the exposed surface of the folded blades 1700 and the exposed surface of the pylon (1704) collectively form a smooth surface, specifically, a smooth convex shape. Although a teardrop shape is shown here, in some embodiments the pylon with the folded blades forms some other shape (e.g., cylindrical, rectangular cuboids with rounded edges, etc.).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An aircraft, comprising:
    a front tiltwing, wherein:
        the front tiltwing includes two non-foldable outer propellers and four foldable inner propellers;
        the four foldable inner propellers are configured to rotate at least some of the time while the front tiltwing is held in a vertical takeoff and landing position; and
        the four foldable inner propellers are configured to be stowed at least some of the time while the front tiltwing is held in a forward flight position; and
    a back tiltwing which includes two non-foldable back propellers and excludes any foldable back propellers.

2. The aircraft recited in claim 1, wherein a diameter of the four foldable inner propellers is larger than a diameter of the two non-foldable outer propellers.

3. The aircraft recited in claim 1, wherein:
    a diameter of the four foldable inner propellers is larger than a diameter of the two non-foldable outer propellers;
    the diameter of the four foldable inner propellers is within a range of 1-1.5 meters; and the diameter of the two non-foldable outer propellers is within a range of 0.5-1 meters.

4. The aircraft recited in claim 1, wherein a diameter of the two non-foldable back propellers is within a range of 0.5-1 meters.

5. The aircraft recited in claim 1, wherein the four foldable inner propellers are connected to the front tiltwing using a first set of pylons which are longer than a second set of pylons which are used to connect the two non-foldable outer propellers to the front tiltwing.

6. The aircraft recited in claim 1, wherein:
a diameter of the four foldable inner propellers is larger than a diameter of the two non-foldable outer propellers;
the diameter of the four foldable inner propellers is within a range of 1-1.5 meters;
the diameter of the two non-foldable outer propellers is within a range of 0.5-1 meters;
a diameter of the two non-foldable back propellers is within a range of 0.5-1 meters; and
the four foldable inner propellers are connected to the front tiltwing using a first set of pylons which are longer than a second set of pylons which are used to connect the two non-foldable outer propellers to the front tiltwing.

7. The aircraft recited in claim 1, wherein the back tiltwing further includes two vertical stabilizers connected to a horizontal stabilizer.

8. A method, comprising:
performing a vertical takeoff of an aircraft during which:
a front tiltwing, which includes two non-foldable outer propellers and four foldable inner propellers, is held in a vertical takeoff and landing position;
a back tiltwing, which includes two non-foldable back propellers, is held in the vertical takeoff and landing position; and
the four foldable inner propellers are rotating;
pitching a nose of the aircraft downward while holding the front and back tiltwing in the vertical takeoff and landing position;
rotating the front tiltwing and the back tiltwing from the vertical takeoff and landing position to a forward flight position;
leveling the aircraft; and
stowing the four foldable inner propellers.

9. The method recited in claim 8, wherein a diameter of the four foldable inner propellers is larger than a diameter of the two non-foldable outer propellers.

10. The method recited in claim 8, wherein:
a diameter of the four foldable inner propellers is larger than a diameter of the two non-foldable outer propellers;
the diameter of the four foldable inner propellers is within a range of 1-1.5 meters; and
the diameter of the two non-foldable outer propellers is within a range of 0.5-1 meters.

11. The method recited in claim 8, wherein a diameter of the two non-foldable back propellers is within a range of 0.5-1 meters.

12. The method recited in claim 8, wherein the four foldable inner propellers are connected to the front tiltwing using a first set of pylons which are longer than a second set of pylons which are used to connect the two non-foldable outer propellers to the front tiltwing.

13. The method recited in claim 8, wherein:
a diameter of the four foldable inner propellers is larger than a diameter of the two non-foldable outer propellers;
the diameter of the four foldable inner propellers is within a range of 1-1.5 meters;
the diameter of the two non-foldable outer propellers is within a range of 0.5-1 meters;
a diameter of the two non-foldable back propellers is within a range of 0.5-1 meters; and
the four foldable inner propellers are connected to the front tiltwing using a first set of pylons which are longer than a second set of pylons which are used to connect the two non-foldable outer propellers to the front tiltwing.

14. A method of performing a vertical landing of an aircraft, comprising:
opening and rotating four foldable inner propellers during which a front tiltwing, which includes two non-foldable outer propellers and the four foldable inner propellers, is held in a forward flight position; and a back tiltwing, which includes two non-foldable back propellers, is held in the forward flight position;
pitching a nose of the aircraft downward;
rotating the front tiltwing and the back tiltwing from the forward flight position to a vertical takeoff and landing position;
leveling the aircraft; and
performing the vertical landing.

15. The method recited in claim 14, wherein a diameter of the four foldable inner propellers is larger than a diameter of the two non-foldable outer propellers.

16. The method recited in claim 14, wherein:
a diameter of the four foldable inner propellers is larger than a diameter of the two non-foldable outer propellers;
the diameter of the four foldable inner propellers is within a range of 1-1.5 meters; and
the diameter of the two non-foldable outer propellers is within a range of 0.5-1 meters.

17. The method recited in claim 14, wherein a diameter of the two non-foldable back propellers is within a range of 0.5-1 meters.

18. The method recited in claim 14, wherein the four foldable inner propellers are connected to the front tiltwing using a first set of pylons which are longer than a second set of pylons which are used to connect the two non-foldable outer propellers to the front tiltwing.

19. The method recited in claim 14, wherein:
a diameter of the four foldable inner propellers is larger than a diameter of the two non-foldable outer propellers;
the diameter of the four foldable inner propellers is within a range of 1-1.5 meters;
the diameter of the two non-foldable outer propellers is within a range of 0.5-1 meters;
a diameter of the two non-foldable back propellers is within a range of 0.5-1 meters; and
the four foldable inner propellers are connected to the front tiltwing using a first set of pylons which are longer than a second set of pylons which are used to connect the two non-foldable outer propellers to the front tiltwing.

* * * * *